United States Patent Office 3,026,279
Patented Mar. 20, 1962

3,026,279
MODIFIED OXIDIZED POLYMER OILS
Thomas M. Mozell, New Brunswick, and Anthony H. Gleason, Scotch Plains, N.J., assignors to Esso Research and Engineering Company, a corporation of Delaware
No Drawing. Filed July 15, 1958, Ser. No. 748,616
21 Claims. (Cl. 260—23)

This invention relates to an improved process for preparing blown hydrocarbon drying oils and to the improved blown oils prepared thereby.

In accordance with the disclosures of Serial No. 498,111, filed March 30, 1955, in the names of John F. McKay and Gabriel E. Jasper, it is known to improve the drying rate, adhesion, pigment wetting properties and gloss of synthetic polymeric hydrocarbon drying oils by contacting them with oxygen or air in the presence of a solvent and a catalyst for a time and at a temperature sufficient to incorporate at least a small amount of oxygen into the oil. According to the teachings of Serial No. 513,606, filed June 6, 1955, in the names of T. A. Neuhaus and H. J. Kiefer, up to about 20% oxygen can be incorporated provided a solvent having a high aromatic hydrocarbon content is used. Varnish bases prepared from these blown oils can be cured in reasonably thick films.

The present invention also provides varnish bases which can be cured in thick films (1–2 mils or thicker). According to the invention these varnish bases can be obtained by carrying out the air blowing in the presence of 5–35% of various unsaturated addition agents including drying and semi-drying oils, i.e., tung oil, cottonseed oil, fish oil, oiticica oil, soybean oil, dehydrated castor oil, dicyclopentadiene, and methyl dicyclopentadiene. A further advantage of this invention is that the addition of these materials increases the rate of oxidation to a significant degree.

The synthetic oils which are suitable for use in connection with the present invention are the oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e.g., with 0–50% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, in the presence of a hydrocarbon soluble peroxide catalyst, such as benzoyl peroxide or cumene hydroperoxide or in some cases in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. patent application, Serial No. 782,850 of Arundale et al., filed October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol-treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 15,000, preferably between about 5,000 to 10,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or ethylol; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective. A particularly effective process for the preparation of the synthetic oil used in this invention is that described and claimed in Serial No. 485,392, filed February 1, 1955, now U.S. Patent No. 2,849,510, granted August 26, 1958, in the names of Stanley E. Jaros and Joseph F. Nelson, the subject matter of which is incorporated herein by reference. In this application, 50 to 100 parts of butadiene-1,3 and 0 to 50 parts of styrene are reacted continuously in a five-stage reactor in the presence of the catalysts, diluents, modifiers, etc. described above.

These oils if blown with air at a temperature between 20° and 150° C. in accordance with the disclosures of Serial No. 498,111 and Serial No. 513,606, the subject matter of which is incorporated herein by reference, would be incompatible with the addition agents of this invention. However, if the oils are first mixed with 5 to 35% of the desired addition agent and then blown with air, oxygen, or other oxygen-containing gas, these addition agents become compatible in all proportions with the polymer oil.

The blowing of the above polymeric drying oils with air or oxygen is best carried out in a solvent of moderate to good solvency, e.g., solvents or solvent mixtures having a kauri butanol value of at least 40. At least a substantial portion of aromatic solvent is generally needed to secure such a K.B. value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low K.B. value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of kauri butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemimellitene, pseudocumene, mesitylene, propyl benzene, cymene, ethyl toluene, methyl ethyl benzene, xylenes, Solvesso–100 (a mixture of aromatic hydrocarbons boiling from about 150° to 175° C.), Solvesso–150 (a mixture of aromatic hydrocarbons boiling from about 190° to 210° C.), or mixtures thereof. Other suitable solvents include the Varsols which are straight run mineral spirits boiling in the range of 140° to 205° C., having API gravities of 40 to 55 and varying in aromatic content from 5 to 35 wt. percent.

Catalysts suitable for the oxidation reaction of this invention include organic salts of metals such as cobalt, lead, iron and manganese, including the naphthenates, octoates, or other hydrocarbon soluble metal salts. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble in aromatic solvents indicating that the oxidation has proceeded to a high degree. The percent of oxygen in the product will vary according to the conditions from a trace to 20% or more.

The following specific examples are presented to illustrate the effects of the present invention. All quantities are expressed in this specification and claims on a weight basis unless stated otherwise.

*Example I*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash 105° F.; boiling range, 150° to 200° C.; solvent power, 33–37 kauri-butanol value (reference scale: benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poises at 50% N.V.M. in Varsol solution and the nonvolatile portion thereof had an average molecular weight of about 10,000.

*Example II*

The oil obtained in accordance with the procedure of Example I was mixed with various addition agents and dissolved in Solvesso–100 (a substantially 100% aromatic hydrocarbon solvent boiling 320°–350° F. and a K.B. value of 93) to make a 35% N.V.M. solution. The mixture was then blown with air in the presence of a small amount of manganese naphthenate at about 220° F. until about 10 to 15% oxygen had been incorporated into the polymer and the rate of oxidation determined. In addition the resulting air blown oil was laid down as a film on sheet steel panels and air dried and baked at 300° and 350° F., and the drying properties and flexibility of the films were determined. The following data were obtained:

RATE OF OXIDATION

| | Percent in Polymer Oil | Time, Hrs. | Percent $O_2$ [a] |
|---|---|---|---|
| Polymer oil (control) | 100 | 3.75 | 10 |
| Linseed | 20 | 3.0 | 10 |
| Soya | 20 | 4.0 | 11.5 |
| Dehydrated castor oil | 20 | 3.0 | 10 |
| Dehydrated castor oil | 33 | 3.0 | 12 |
| Dicyclopentadiene | 20 | 2.5 | 10.5 |
| Dicyclopentadiene | 33 | 2.3 | 16.9 |
| Methyl dicyclopentadiene | 20 | 2.5 | 12.5 |

[a] Corrected for vegetable oil in feed.

The above data show that the rate of oxidation of the polymer oil blends is 1.5 to 3 times that of the polymer oil alone if based on equal amounts of oxygen take-up. This is a significant operational advantage since it increases the capacity of the plant.

PROPERTIES OF BAKED FILMS [a]

|  | 300° F.[b] | | | 350° F.[b] | | | Percent $O_2$[c] |
| --- | --- | --- | --- | --- | --- | --- | --- |
|  | Th. | H. | Fl. | Th. | H. | Fl. |  |
| Polymer oil | 1.7 | 18 | ¾ | 2.2 | 27 | ¾ | 10 |
| 20% Soya | 1.7 | 14 | ¾ | 1.7 | 26 | ⅛ | 11.5 |
| 20% Linseed | 1.6 | 8 | ⅛ | 2.3 | 24 | ¼ | 10 |
| 20% Dehydrated Castor Oil | 1.8 | 12 | ⅛ | 2.2 | 34 | ⅛ | 10 |
| 20% DCP[d] | 1.9 | 20 | ¾ | 2.0 | 39 | ⅝ | 10.4 |
| 20% MDCP[e] | 2.0 | 20 | ¾ | 2.2 | 30 | ¾ | 12.8 |
| 33% Dehydrated Castor Oil | 2.1 | 4 | ⅛ | 2.2 | 10 | ⅛ | 12 |
| 33% DCP[d] | 1.8 | 20 | ⅛ | 1.8 | 22 | ⅛ | 11.6 |
| 33% DCP[d] |  |  |  | 2.0 | 24 | ¼ | 16.9 |

[a] Chem. res. not tabulated. All were good.
[b] Th.=thickness in mils; H.=Sward hardness (glass=100); Fl.=flex; smallest mandril over which film did not fail.
[c] Oxygen percentages corrected for vegetable oil in mixture.
[d] Dicyclopentadiene.
[e] Methyl dicyclopentadiene.

The above data show that at the higher bake temperature the blends are generally superior with respect to flexibility.

PROPERTIES OF AIR DRIED FILMS

|  | Percent $O_2$[a] | 1 day[b] | 2 days | [c] | | |
| --- | --- | --- | --- | --- | --- | --- |
|  |  |  |  | Th. | H. | Fl. |
| Polymer oil (control) | 10 | 1 | 1 | 1.4 | 10 | ⅛ |
| 20% Soya | 11.5 | 3 | 1 | 1.4 | 16 | ⅛ |
| 20% Linseed | 10 | 2 | 1 | 1.5 | 14 | ⅛ |
| 20% Dehydrated Castor Oil | 10 | 3 | 1 | 1.5 | 14 | ⅜ |
| 20% DCP[d] | 10.4 | 2 | 0 | 1.5 | 26 | ⅝ |
| 20% MDCP[e] | 12.8 | 2 | 1 | 1.5 | 24 | ½ |

[a] Oxygen percentages corrected for vegetable oil in mixture.
[b] 3—tacky, but dust free; 0—tack free.
[c] Th.=Thickness in mils; H.=Sward hardness (glass=100); Fl.=Flex; smallest mandril over which film did not fail. All films were ¾" in 4 weeks time.
[d] Dicyclopentadiene.
[e] Methyl dicyclopentadiene.

As far as air-dried films are concerned, the blends gave improved hardness. The chemical resistance and drying rate of the blend with dicyclopentadiene was better than the others.

The nature and objects of the present invention having been thus fully set forth and specific examples of the same given, what is claimed as new and useful and desired to be secured by Letters Patent is:

1. A process for improving the properties of a liquid polymer of a conjugated diolefin of 4 to 6 carbon atoms which comprises mixing said liquid polymer with 5–35% of a material selected from the group consisting of natural drying oils, semi-drying oils, dicyclopentadiene and methyl dicyclopentadiene and blowing said mixture in a hydrocarbon solvent with a gas chosen from the group consisting of air and oxygen at a temperature between 20° and 150° C. until at least a small amount of oxygen has been incorporated into the liquid polymer.

2. Process according to claim 1 in which the solvent is substantially 100% aromatic hydrocarbon solvent boiling 320°–350° F.

3. Process according to claim 1 in which the liquid polymer is polybutadiene.

4. Process according to claim in which the liquid polymer is a copolymer of butadiene and styrene.

5. Process according to claim 1 in which the process is carried out in the additional presence of small amounts of organic salts of a metal chosen from the group consisting of cobalt, manganese, lead and iron.

6. Process according to claim 1 in which the added material is linseed oil.

7. Process according to claim 1 in which the added material is dehydrated castor oil.

8. Process according to claim 1 in which the added material is dicyclopentadiene.

9. Process according to claim 1 in which the added material is methyl dicyclopentadiene.

10. Process according to claim 1 in which the added material is a natural drying oil.

11. Process according to claim 1 in which the added material is a semi-drying oil.

12. A composition of matter which comprises an air-blown liquid mixture of a liquid polymer of butadiene and 5–35% of a material selected from the group consisting of natural drying oils, semi-drying oils, dicyclopentadiene, and methyl dicyclopentadiene.

13. A composition according to claim 12 in which the added material is dehydrated castor oil.

14. A composition of matter according to claim 12 in which the added material is linseed oil.

15. A composition of matter according to claim 12 in which the added material is dicyclopentadiene.

16. A composition of matter according to claim 12 in which the added material is methyl discyclopentadiene.

17. A process for preparing a drying oil of improved properties which comprises blowing a mixture of 5–35% of a first material selected from the group consisting of natural drying oils, semi-drying oils, dicyclopentadiene, and methyl discyclopentadiene and 95–65% of a liquid polymer oil composed of 50 to 100 parts of butadiene and 0 to 50 parts of a vinyl aromatic hydrocarbon with a gas chosen from the group consisting of air and oxygen in the presence of from 0.001 to 1% of an organic salt of a metal selected from the group consisting of cobalt, manganese, lead and iron for a sufficient time to incorporate from 0.05 to 20% oxygen and recovering the product as a light-colored drying oil.

18. Process according to claim 17 in which the mixture comprises 5–35% of linseed oil and 95–65% of the said polymer oil.

19. Process according to claim 17 in which the mixture comprises 5–35% of dehydrated castor oil and 95–65% of the said polymer oil.

20. Process according to claim 17 in which the mixture comprises 5–35% of dicyclopentadiene and 95–65% of the said polymer oil.

21. Process according to claim 17 in which the mixture comprises 5–35% of methyl dicyclopentadiene and 95–65% of the said polymer oil.

References Cited in the file of this patent

UNITED STATES PATENTS

| 2,812,371 | Green | Nov. 5, 1957 |
| 2,908,585 | Koenecke | Oct. 13, 1959 |

FOREIGN PATENTS

| 535,226 | Canada | Jan. 1, 1957 |